(12) United States Patent
Wilkie et al.

(10) Patent No.: US 8,465,305 B2
(45) Date of Patent: Jun. 18, 2013

(54) ELECTRICAL SYSTEM HAVING WITHDRAWABLE ELECTRICAL APPARATUS AND SHUTTER ASSEMBLY WITH RAMPED ENGAGEMENT SURFACES

(75) Inventors: William Edward Wilkie, Fletcher, NC (US); Michael Howard Abrahamsen, Greenwood, SC (US); Michael Davis Pearce, Plum Branch, SC (US)

(73) Assignee: Eaton Corporation, Cleveland, OH (US)

( * ) Notice: Subject to any disclaimer, the term of this patent is extended or adjusted under 35 U.S.C. 154(b) by 62 days.

(21) Appl. No.: 13/085,570

(22) Filed: Apr. 13, 2011

(65) Prior Publication Data

US 2012/0264315 A1    Oct. 18, 2012

(51) Int. Cl.
*H01R 13/44*    (2006.01)
(52) U.S. Cl.
USPC .......................................... 439/137; 439/140
(58) Field of Classification Search
USPC ................................ 439/136–140; 200/50.22
See application file for complete search history.

(56) References Cited

U.S. PATENT DOCUMENTS

| | | | |
|---|---|---|---|
| 3,990,758 A * | 11/1976 | Petterson | 439/138 |
| 4,486,815 A | 12/1984 | Takahashi | |
| 6,896,530 B2 * | 5/2005 | Nishio et al. | 439/137 |
| 6,908,319 B2 * | 6/2005 | Sasame et al. | 439/137 |
| 7,114,968 B2 * | 10/2006 | Healy | 439/137 |
| 2003/0077929 A1 * | 4/2003 | Funatsu | 439/137 |
| 2003/0148645 A1 * | 8/2003 | Hashimoto | 439/137 |

FOREIGN PATENT DOCUMENTS

| | | |
|---|---|---|
| DE | 23 15 569 A1 | 2/1975 |
| EP | 0 113 887 A2 | 7/1984 |

OTHER PUBLICATIONS

European Patent Office, "International Search Report and Written Opinion", Sep. 3, 2012, 9 pp.

* cited by examiner

*Primary Examiner* — Thanh Tam Le
(74) *Attorney, Agent, or Firm* — Eckert Seamans Cherin & Mellott, LLC; Brij K. Agarwal

(57) ABSTRACT

A shutter assembly is provided for an electrical system including at least one withdrawable electric apparatus, such as a circuit breaker, and an electrical bus member. A protruding structure of the circuit breaker is removably coupled to a corresponding primary contact of the electrical bus member to electrically connect the circuit breaker and the electrical bus member. The shutter assembly includes a pair of cover members that each have a ramped engagement surface and that are movable between a first position in which the corresponding primary contact of the electrical bus member is isolated and a second position in which the cover members are offset from the primary contact to allow the circuit breaker to be connected with the primary contact and the electrical bus member.

20 Claims, 6 Drawing Sheets

ELECTRICAL SYSTEM HAVING WITHDRAWABLE ELECTRICAL APPARATUS AND SHUTTER ASSEMBLY WITH RAMPED ENGAGEMENT SURFACES

BACKGROUND

1. Field

The disclosed concept relates generally to electrical systems and, more particularly, to electrical systems employing removable electrical apparatus. The disclosed concept also relates to withdrawable electrical switching apparatus, such as circuit breakers. The disclosed concept further relates to shutter assemblies in switchgear for draw-out circuit breakers and other removable electrical devices.

2. Background Information

Electrical apparatus, such as electrical switching apparatus used in power distribution systems, are often mounted within a switchgear enclosure (e.g., without limitation, a panelboard; a load center; a meter breaker panel) either individually or in combination with other electrical meters or electrical devices (e.g., without limitation, circuit switching devices and circuit interrupters such as circuit breakers, draw-out fuses, transformer disconnects, contactors, motor starters, motor controllers and other load controllers). Such electrical devices often can be withdrawn from the switchgear enclosure during the ordinary course of using the device, and such devices can therefore be referred to as being "withdrawable" or "removable".

The electrical enclosure typically includes a number of electrical bus members. Electrical connector assemblies, sometimes generally referred to as breaker or primary disconnects, mechanically couple and electrically connect conductors of the electrical apparatus (circuit breakers, for instance) to corresponding switchgear-mounted primary contacts (e.g., without limitation, stabs) which are in turn electrically connected to electrical bus members within the switchgear. The "conductors" might actually include a housing for the actual conductive element or some attachment on the pole units. To enhance safety, it is desirable to electrically insulate or close off (e.g., isolate) access to energized switchgear connections, for example when a circuit breaker or other withdrawable device is removed from the enclosure. However, there is limited space available within the switchgear enclosure to provide an electrically insulating or isolating mechanism. It is also important not to undesirably impede the ability to relatively quickly and easily connect and disconnect the breaker or other withdrawable device with the electrical connections.

There is, therefore, room for improvement in electrical systems, and in electrical switching apparatus, such as circuit breakers, and in electrical isolation mechanisms therefor.

SUMMARY

These needs and others are met by embodiments of the disclosed concept, which are directed to a shutter assembly for a withdrawable electrical apparatus, such as a circuit breaker. Among other benefits, the shutter assembly occupies relatively minimal space yet effectively isolates and electrically insulates the breaker connections when the circuit breaker is drawn into and out of electrical contact with the electrical bus members of an electrical system.

An aspect of the disclosed and claimed concept is to provide an improved shutter assembly that isolates a primary contact of an electrical bus member during insertion and removal of an withdrawable electric apparatus.

Another aspect of the disclosed and claimed concept is to provide an improved shutter assembly that occupies relatively little space within a switchgear enclosure.

Another aspect of the disclosed and claimed concept is to provide an improved shutter assembly that employs cover members having ramped engagement surfaces that are cooperable with a protruding structure of an withdrawable electric apparatus to move the cover members between a first position overlying a number of primary contacts and a second position offset from the number of primary contacts.

Accordingly, an improved shutter assembly is provided for an electrical system. The electrical system is structured to cooperate with at least one withdrawable electric apparatus and a number of electrical bus members. At least some of the number of electrical bus members are each structured to include a primary contact. The withdrawable electric apparatus is structured to include a number of protruding structures and is further structured to be coupled with a corresponding primary contact to electrically connect together the at least one withdrawable electric apparatus and the electrical bus members. The shutter assembly can be generally stated as including a support apparatus and a cover apparatus. The support apparatus is structured to be situated adjacent at least a portion of a primary contact of a bus member of the number of bus members. The cover apparatus is disposed on the support apparatus and is movable between a first position and a second position. The cover apparatus in the first position is structured to overlie at least a portion of the primary contact. The cover apparatus in the second position is structured to be offset from the primary contact. The cover apparatus comprises at least a first cover member that comprises an engagement structure having a ramped engagement surface that is structured to be engaged by a protruding structure of an withdrawable electric apparatus to move the cover apparatus between the first and second positions.

An electrical switching apparatus and an electrical system employing the aforementioned shutter assembly are also disclosed.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
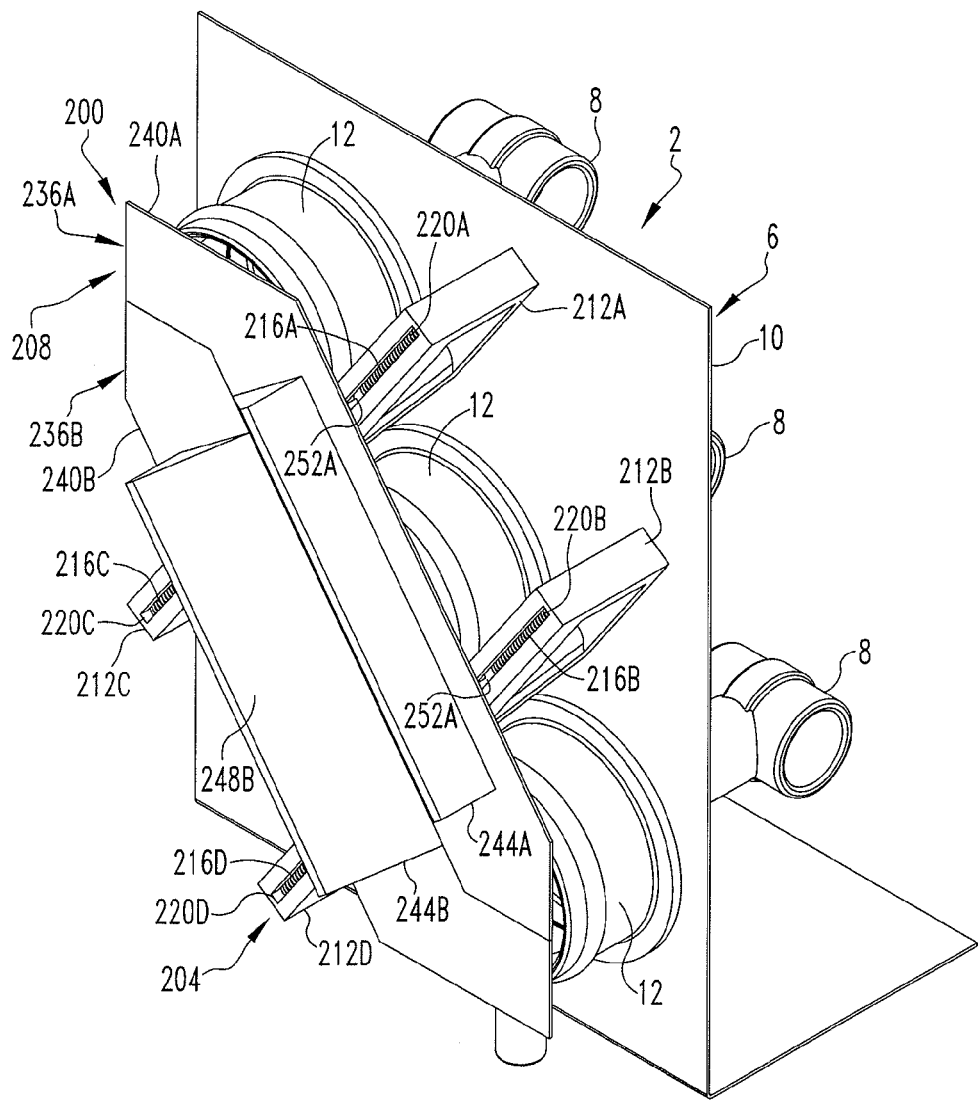
FIG. 1 is an perspective view of a portion of an electrical system, including shutter assembly therefor in accordance with an embodiment of the disclosed concept, with the shutter assembly shown in a first position corresponding to a withdrawable electrical device (not shown in FIG. 1) being electrically disconnected.

Directional phrases used herein, such as, for example, inward, outward, up, down, top, bottom, clockwise, counterclockwise and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "number" shall mean one or an integer greater than one (i.e., a plurality).

Figure 2:
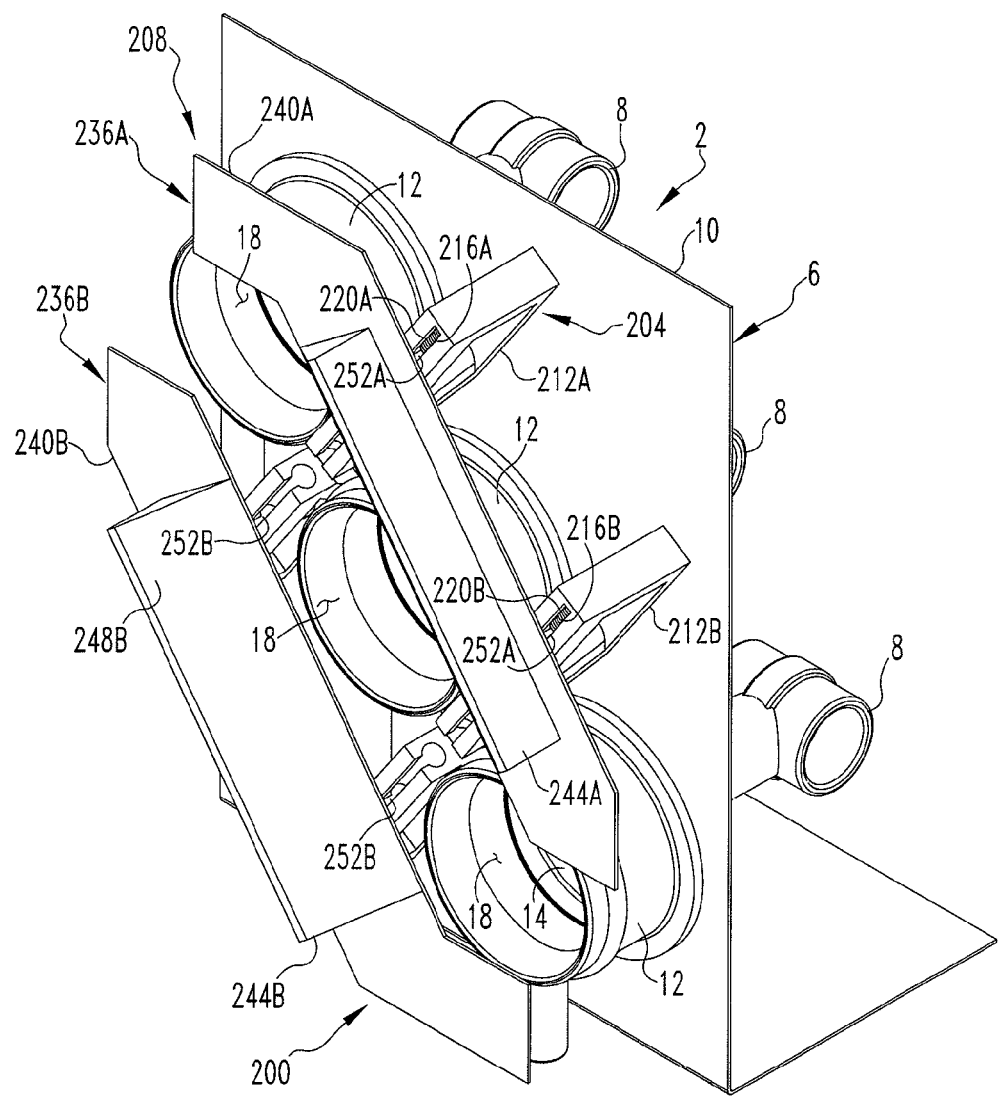
FIG. 2 is another perspective view of the portion of the electrical system and shutter assembly therefor, with the shutter assembly shown in a second position corresponding to the withdrawable electrical device (not shown in FIG. 2) being electrically connected.

FIGS. 1 and 2 show a shutter assembly 200 for an electrical system 2 (schematically shown). The electrical system 2 includes a withdrawable electrical apparatus which, in the exemplary embodiment depicted herein, is in the form of a circuit breaker 100 (which is partially and schematically shown in FIGS. 5 and 6), an electrical bus member 8 (partially shown) having a primary contact 14 (shown in FIGS. 4 and 5), and a switchgear enclosure 6 (partially and schematically shown). The electrical system 2 can be employed at any position within an electrical distribution system, and the exemplary embodiment depicted herein is not intended to be limiting. While the withdrawable electrical apparatus is depicted herein as a circuit breaker, it is reiterated that the disclosed concept can be used in connection with any withdrawable electrical device such as draw-out fuses, transformer disconnects, contactors, motor starters, motor controllers and other load controllers, and the like without limitation.

Figure 5:
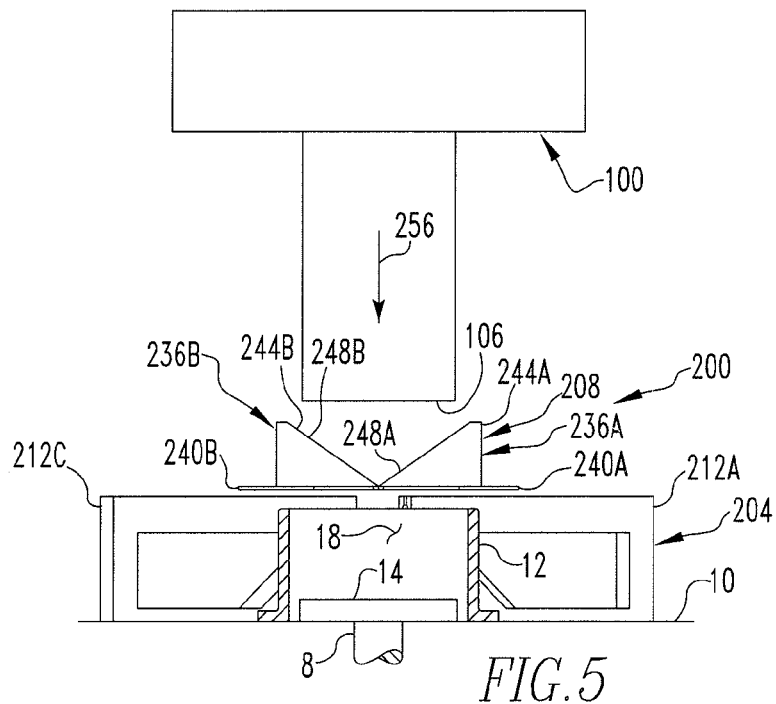
FIG. 5 is a section view as taken along line 5-5 of FIG. 3.
Figure 6:
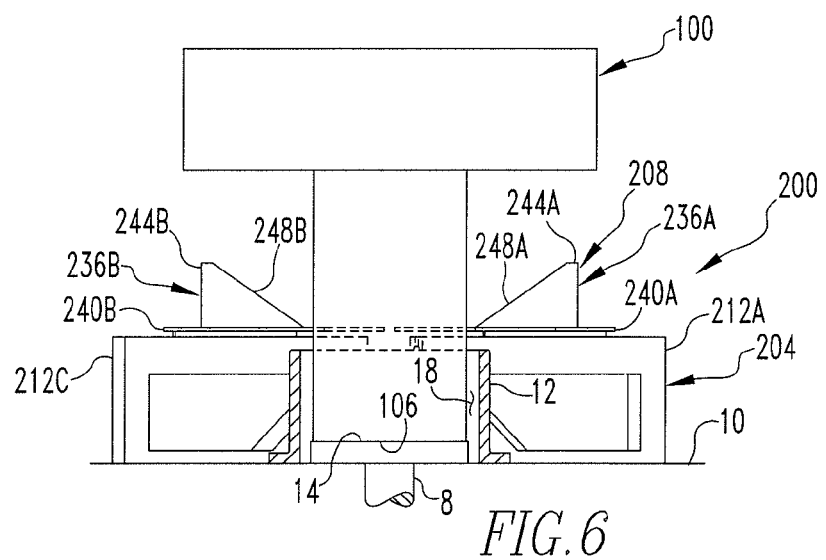
FIG. 6 is a section view as taken along line 6-6 of FIG. 4.

The partially shown switchgear enclosure 6 is depicted as including a plate 10 upon which is situated a plurality of annular flanges 12. Portions of the electrical bus members 8 extend through the flanges 12, as can be seen in FIGS. 5 and 6. The flanges 12 each have a receptacle 18 formed therein where the primary contact 14 is disposed. Each primary contact 14 is electrically connected with a corresponding one of the bus members 8 and is structured to be electrically connected with the circuit breaker 100 as set forth below.

The circuit breaker 100 includes protruding component in the exemplary form of a conductor 106 that is removably mechanically coupled and electrically connected to the corresponding primary contact 14, as best shown in FIG. 5, to electrically connect the circuit breaker 100 to the electrical bus member 8 of the electrical system 2. It will be appreciated, however, that any known or suitable alternative number, type and/or configuration of electrical switching apparatus, conductors, primary contacts and/or bus members could be employed, without departing from the scope of the disclosed concept. In this regard, while the conductor 106 is depicted herein as interacting with the shutter assembly 200, it is noted that any protruding structure or component such as a housing for a conductive element or some attachment on the pole units, by way of example and without limitation, of a withdrawable electrical apparatus such as the circuit breaker 100 can interact with the shutter assembly as described herein without departing from the present concept.

Figure 3:
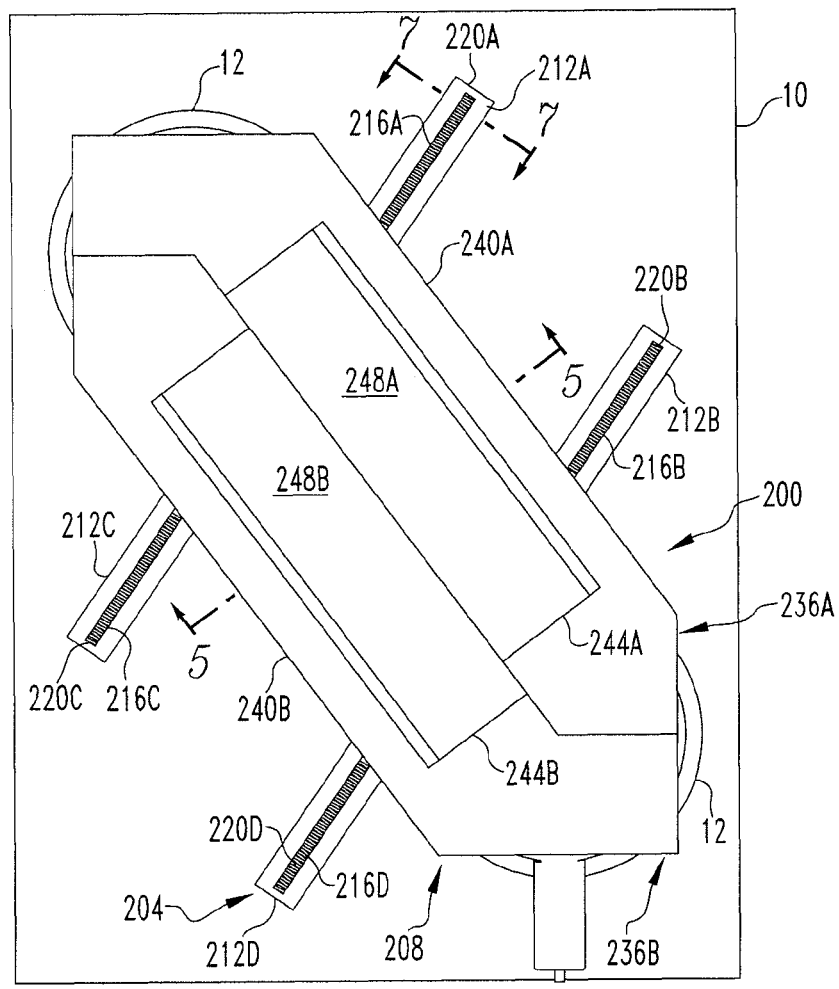
FIG. 3 is a front elevational view of the electrical system of FIG. 1.
Figure 4:
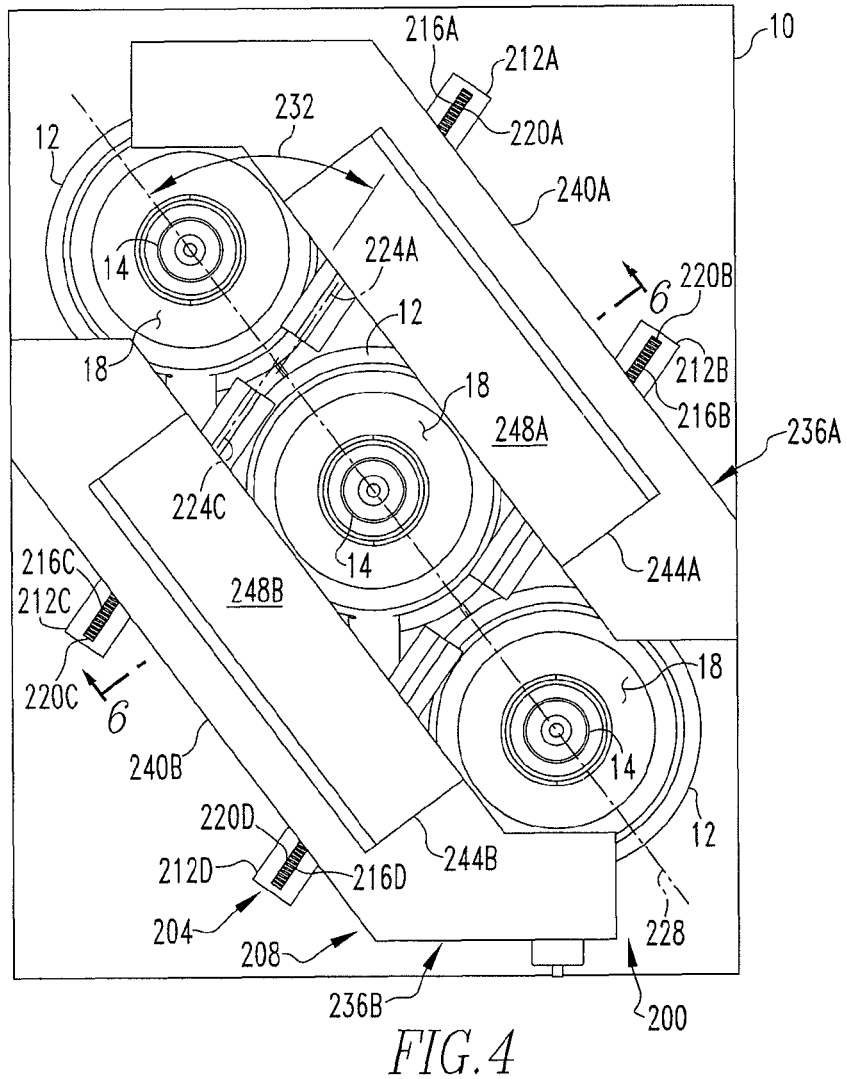
FIG. 4 is a front elevational view of the electrical system of FIG. 2.

With reference to FIG. 1, and also FIGS. 2-4, it can be seen that the shutter assembly 200 includes a support apparatus 204 and a cover apparatus 208. The cover apparatus 208 is disposed on the support apparatus 204.

The support apparatus can be said to comprise a track apparatus that includes a plurality of track elements 212A, 212B, 212C, and 212D which are each elongated and which each have formed therein an elongated channel 216A, 216B, 216C, and 216D, respectively. The support apparatus 204 further comprises a biasing element 220A, 220B, 220C, and 220D in the exemplary and non-limiting form of a coil spring situated in each of the channels 216A, 216B, 216C, and 216D, respectively.

As can be understood from FIG. 4, and particularly from the broken lines 224A and 224C that are depicted as extending along the longitudinal extent of the track elements 212A and 212C, respectively, the track elements 212A and 212C are oriented substantially parallel with one another but are shifted from one another in a direction lateral to the longitudinal extent (represented by the broken lines 224A and 224C) of the track element 212A and 212C.

As can be understood from FIGS. 3 and 4, the track elements 212A and 212B are oriented parallel with one another, as are the track elements 212C and 212D. As can be understood from FIG. 4, the primary contacts 14 are aligned with one another along an axis 228, and it can also be seen that the track elements 212A,B,C,D are oriented at an angle 232 that is oblique with respect to the axis 228. As employed herein, the expression "oblique" and variations thereof shall refer broadly to an angular relationship that is neither parallel nor perpendicular.

The cover apparatus 208 can be said to include a first cover member 236A and a second cover member 236B which, in the exemplary embodiment depicted herein, are identical to one another. However, the first cover member 236A cooperates with the track elements 212A and 212B, whereas the second cover member 236B cooperates with the track elements 212C and 212D. The first and second cover members 236A,B can be said to each include a generally planar blocking element 240A,B, a ramped engagement structure 244A,B, and a ramped engagement surface 248A,B. The ramped engagement surface 248A,B can be said to face generally toward one another, and this enables their interaction with the conductors 106 as will be described in greater detail below.

The first and second cover members 236A and 236B further each include a pair of mounting elements 252A,B that are slidably situated in the elongated channels 216A,B,C,D. The first and second cover members 236A and 236B can be formed of any of a variety of materials having sufficient rigidity and stiffness to withstand engagements with the conductors 106 and having a sufficiently high dielectric value to electrically isolate the primary contacts 14.

The cover apparatus 208 is advantageously movable between a first position, as is indicated generally in FIGS. 1, 3, and 5, and a second position, as is indicated generally in FIGS. 2, 4, and 6. In the first position of the cover apparatus 208, the first and second cover members 236A,B and, more particularly, the blocking elements 240A,B, are engaged with one another to block access to the primary contacts 14. In so doing, the blocking elements 240A,B together overlie each of the primary contacts 14, as can be best understood from FIG. 3, it being noted that the primary contacts 14 cannot be seen in FIG. 3 because the blocking elements 240A,B overlie them, but it is noted that the primary contacts 14 can nevertheless can be seen in FIG. 4. This has the effect of electrically isolating the primary contacts 14 from one another and from other elements.

In the second position of the cover apparatus 208, the blocking elements 240A,B are each offset from the primary contacts 14, as can be understood from FIG. 4.

As can be best understood from FIGS. 5 and 6, when the conductors 106 of the electrical switching apparatus 100 are moved toward the cover apparatus 208, the cover apparatus 208 is likely at least initially in the first position, as is indicated in FIG. 5. As the electrical switching apparatus 100 is moved toward the shutter assembly 200 as is indicated at the arrow 256, the conductors 106 engage the ramped engagement surfaces 248A,B of the ramped engagement structures 244A,B. Such engagement overcomes the bias of the biasing elements 220A,B,C,D to push the first and second cover members 236A and 236B generally away from one another and to cause the blocking elements 240A,B to be offset from the primary contacts 14. This, in turn, permit the conductors 106 to be received in the receptacles 18 and to become electrically engaged with the primary contacts 14. Such electrical engagement between the conductors 106 and the primary contacts 14 is depicted generally in FIG. 6.

If the electrical switching apparatus 100 is removed from the electrical system 2, such as by moving the electrical switching apparatus 100 in a direction opposite the arrow 256, the conductors 106 are disengaged from the primary contacts 14, are removed from the receptacles 18, and are ultimately removed from engagement with the first and second cover members 236A and 236B. Accordingly, the biasing elements 220A,B,C,D bias the first and second cover members 236A and 236B toward one another until they engage one another, as is depicted in FIGS. 1, 3, and 5. In performing such a removal of the electrical switching apparatus 100, the conductors 106 likely will engage the ramped engagement surfaces 248A,B during such withdrawal until the conductors 106 have fully cleared the first and second cover members 236A,B.

Figure 7:
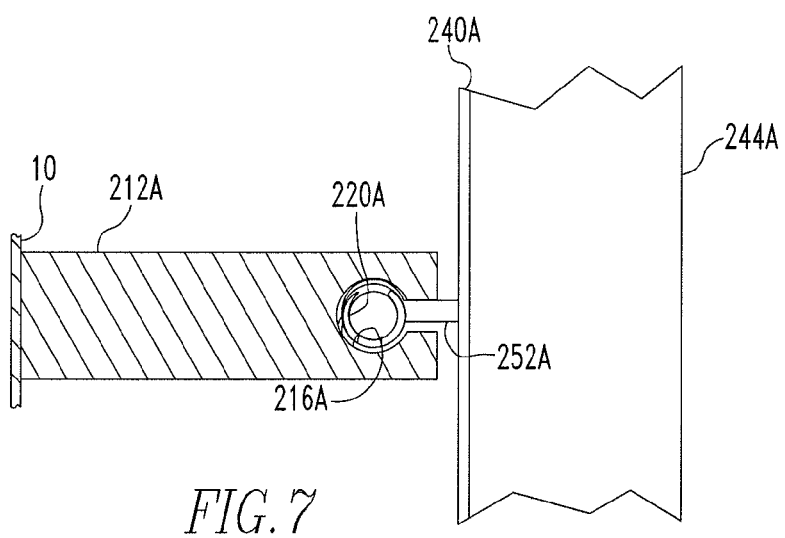
FIG. 7 is a section view as taken along line 7-7 of FIG. 3.

FIG. 7 depicts the mounting element 252A being slidably disposed in the channel 216A and biased by the biasing element 220A. It is understood that different configurations of the mounting elements 252A,B and different configurations of the channel 216A,B,C,D can be employed without departing from the scope of the present concept.

Accordingly, the disclosed shutter assembly 200 provides an automatic safety mechanism for effectively closing off (e.g., isolating; electrically insulating) access to energized breaker connections and switchgear connections, for example, when the circuit breaker 100 is disconnected or removed. In addition to being capable of automatically moving out of the way (e.g., without limitation, moving to either side) when inserting the circuit breaker 100, it also occupies relatively little space within the circuit breaker 100 and/or electrical system 2.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A shutter assembly for an electrical system, the electrical system being structured to cooperate with at least one withdrawable electric apparatus and a number of electrical bus members, at least some of the number of electrical bus members being structured to include a primary contact, the withdrawable electric apparatus being structured to include a number of protruding structures, the withdrawable electric apparatus being structured to be coupled with the primary contact of an electrical bus member of the number of electrical bus members to electrically connect together the at least one withdrawable electric apparatus and the electrical bus members, the shutter assembly comprising:
a support apparatus comprising an elongated structure and being structured to be situated adjacent at least a portion of the primary contact of a bus member of the number of bus members; and
a cover apparatus disposed on the support apparatus and being movable between a first position and a second position, the cover apparatus in the first position being structured to overlie at least a portion of the primary contact, the cover apparatus in the second position being structured to be offset from the primary contact, the cover apparatus comprising at least a first cover member comprising an engagement structure having a ramped engagement surface that is structured to be engaged by the protruding structure of the withdrawable electric apparatus to translate the cover apparatus on the elongated structure between the first and second positions.

2. The shutter assembly of claim 1 wherein the cover apparatus further comprises a second cover member comprising another engagement structure having another ramped engagement surface that is structured to be engaged by the protruding structure of the withdrawable electric apparatus to move the cover apparatus between the first and second positions, the at least first and second cover members being in contact with one another in the first position, the at least first and second cover members being spaced apart from one another in the second position.

3. The shutter assembly of claim 2 wherein the ramped engagement surface and the another ramped engagement surface face generally toward one another.

4. The shutter assembly of claim 1 wherein the support apparatus comprises a biasing element which biases the at least first cover member toward the first position.

5. A shutter assembly for an electrical system, the electrical system being structured to cooperate with at least one withdrawable electric apparatus and a number of electrical bus members, at least some of the number of electrical bus members being structured to include a primary contact, the withdrawable electric apparatus being structured to include a number of protruding structures, the withdrawable electric apparatus being structured to be coupled with the primary contact of an electrical bus member of the number of electrical bus members to electrically connect together the at least one withdrawable electric apparatus and the electrical bus members, the shutter assembly comprising:
a support apparatus structured to be situated adjacent at least a portion of the primary contact of a bus member of the number of bus members; and
a cover apparatus disposed on the support apparatus and being movable between a first position and a second position, the cover apparatus in the first position being structured to overlie at least a portion of the primary contact, the cover apparatus in the second position being structured to be offset from the primary contact, the cover apparatus comprising at least a first cover member comprising an engagement structure having a ramped engagement surface that is structured to be engaged by the protruding structure of the withdrawable electric apparatus to translate the cover apparatus between the first and second positions;
wherein the support apparatus comprises a biasing element which biases the at least first cover member toward the first position; and
wherein the support apparatus further comprises a track apparatus that comprises a pair of track elements oriented substantially parallel to one another, the at least first cover member further comprising a pair of mounting elements that cooperate with the pair of track elements to slidably mount the at least first cover member to the pair of track elements.

6. The shutter assembly of claim 5 wherein the pair of track element each have an elongated channel formed therein, and wherein a portion of each of the pair of mounting elements are slidably situated in the elongated channels.

7. The shutter assembly of claim 6 wherein the biasing element comprises a pair of elongated biasing elements situated in the elongated channels.

8. A shutter assembly for an electrical system, the electrical system being structured to cooperate with at least one withdrawable electric apparatus and a number of electrical bus members, at least some of the number of electrical bus members being structured to include a primary contact, the withdrawable electric apparatus being structured to include a number of protruding structures, the withdrawable electric apparatus being structured to be coupled with the primary contact of an electrical bus member of the number of electrical bus members to electrically connect together the at least one withdrawable electric apparatus and the electrical bus members, the shutter assembly comprising:

a support apparatus comprising an elongated structure and being structured to be situated adjacent at least a portion of the primary contact of a bus member of the number of bus members; and a cover apparatus disposed on the support apparatus and being movable between a first position and a second position, the cover apparatus in the first position being structured to overlie at least a portion of the primary contact, the cover apparatus in the second position being structured to be offset from the primary contact, the cover apparatus comprising at least a first cover member comprising an engagement structure having a ramped engagement surface that is structured to be engaged by the protruding structure of the withdrawable electric apparatus to translate the cover apparatus on the elongated structure between the first and second positions; and wherein the cover apparatus in the first position is structured to overlie at least a portion of each of a plurality of primary contacts of a plurality of electrical bus members of the number of electrical bus members, the plurality of primary contacts being aligned along an axis, the support apparatus being movable between the first and second positions along a direction oblique to the axis.

9. The shutter assembly of claim 8 wherein the cover apparatus further comprises a second cover member comprising another engagement structure having another ramped engagement surface that is structured to be engaged by the protruding structure of the withdrawable electric apparatus to move the cover apparatus between the first and second positions, and wherein the support apparatus further comprises a track apparatus that comprises at least one elongated track element that cooperates with the at least first cover member and at least one other elongated track element that cooperates with the second cover member, the at least one elongated track element and the at least one other elongated track element being oriented substantially parallel with one another.

10. The shutter assembly of claim 9 wherein the at least one elongated track element and the at least one other elongated track element are shifted from another in a direction lateral to the longitudinal extent of the elongated track elements.

11. An electrical system structured to cooperate with at least one withdrawable electric apparatus and a number of electrical bus members, at least some of the number of electrical bus members being structured to include a primary contact, the withdrawable electric apparatus being structured to include a number of protruding structures, the withdrawable electric apparatus being structured to be coupled with the primary contact of an electrical bus member of the number of electrical bus members to electrically connect together the at least one withdrawable electric apparatus and the electrical bus members, the electrical system comprising:

a switchgear enclosure;

a shutter assembly comprising a support apparatus and a cover apparatus;

the support apparatus comprising an elongated structure and being structured to be situated adjacent at least a portion of the primary contact of a bus member of the number of bus members; and the cover apparatus disposed on the support apparatus and being movable between a first position and a second position, the cover apparatus in the first position being structured to overlie at least a portion of the primary contact, the cover apparatus in the second position being structured to be offset from the primary contact, the cover apparatus comprising at least a first cover member comprising an engagement structure having a ramped engagement surface that is structured to be engaged by the protruding structure of the withdrawable electric apparatus to translate the cover apparatus on the elongated structure between the first and second positions.

12. The electrical system of claim 11 wherein the cover apparatus further comprises a second cover member comprising another engagement structure having another ramped engagement surface that is structured to be engaged by the protruding structure of the withdrawable electric apparatus to move the cover apparatus between the first and second positions, the at least first and second cover members being in contact with one another in the first position, the at least first and second cover members being spaced apart from one another in the second position.

13. The electrical system of claim 12 wherein the ramped engagement surface and the another ramped engagement surface face generally toward one another.

14. The electrical system of claim 11 wherein the support apparatus comprises a biasing element which biases the at least first cover member toward the first position.

15. An electrical system structured to cooperate with at least one withdrawable electric apparatus and a number of electrical bus members, at least some of the number of electrical bus members being structured to include a primary contact, the withdrawable electric apparatus being structured to include a number of protruding structures, the withdrawable electric apparatus being structured to be coupled with the primary contact of an electrical bus member of the number of electrical bus members to electrically connect together the at least one withdrawable electric apparatus and the electrical bus members, the electrical system comprising:

a switchgear enclosure;

a shutter assembly comprising a support apparatus and a cover apparatus;

the support apparatus structured to be situated adjacent at least a portion of the primary contact of a bus member of the number of bus members;

the cover apparatus disposed on the support apparatus and being movable between a first position and a second position, the cover apparatus in the first position being structured to overlie at least a portion of the primary contact, the cover apparatus in the second position being structured to be offset from the primary contact, the cover apparatus comprising at least a first cover member comprising an engagement structure having a ramped engagement surface that is structured to be engaged by the protruding structure of the withdrawable electric apparatus to move the cover apparatus between the first and second positions;

wherein the support apparatus comprises a biasing element which biases the at least first cover member toward the first position; and wherein the support apparatus further comprises a track apparatus that comprises a pair of track elements oriented substantially parallel to one another, the at least first cover member further comprising a pair of mounting elements that cooperate with the pair of track elements to slidably mount the at least first cover member to the pair of track elements.

16. The electrical system of claim 15 wherein the pair of track element each have an elongated channel formed therein, and wherein a portion of each of the pair of mounting elements are slidably situated in the elongated channels.

17. The electrical system of claim 16 wherein the biasing element comprises a pair of elongated biasing elements situated in the elongated channels.

18. An electrical system structured to cooperate with at least one withdrawable electric apparatus and a number of electrical bus members, at least some of the number of electrical bus members being structured to include a primary contact, the withdrawable electric apparatus being structured to include a number of protruding structures, the withdrawable electric apparatus being structured to be coupled with the primary contact of an electrical bus member of the number of electrical bus members to electrically connect together the at least one withdrawable electric apparatus and the electrical bus members, the electrical system comprising:
a switchgear enclosure;
a shutter assembly comprising a support apparatus and a cover apparatus;
the support apparatus comprising an elongated structure and being structured to be situated adjacent at least a portion of the primary contact of a bus member of the number of bus members;
the cover apparatus disposed on the support apparatus and being movable between a first position and a second position, the cover apparatus in the first position being structured to overlie at least a portion of the primary contact, the cover apparatus in the second position being structured to be offset from the primary contact, the cover apparatus comprising at least a first cover member comprising an engagement structure having a ramped engagement surface that is structured to be engaged by the protruding structure of the withdrawable electric apparatus to move the cover apparatus on the elongated structure between the first and second positions; and
wherein the cover apparatus in the first position is structured to overlie at least a portion of each of a plurality of primary contacts of a plurality of electrical bus members of the number of electrical bus members, the plurality of primary contacts being aligned along an axis, the support apparatus being movable between the first and second positions along a direction oblique to the axis.

19. The electrical system of claim 18 wherein the cover apparatus further comprises a second cover member comprising another engagement structure having another ramped engagement surface that is structured to be engaged by the protruding structure of the withdrawable electric apparatus to move the cover apparatus between the first and second positions, and wherein the support apparatus further comprises a track apparatus that comprises at least one elongated track element that cooperates with the at least first cover member and at least one other elongated track element that cooperates with the second cover member, the at least one elongated track element and the at least one other elongated track element being oriented substantially parallel with one another.

20. The electrical system of claim 19 wherein the at least one elongated track element and the at least one other elongated track element are shifted from another in a direction lateral to the longitudinal extent of the elongated track elements.

* * * * *